United States Patent
Usami

(10) Patent No.: US 10,084,999 B2
(45) Date of Patent: Sep. 25, 2018

(54) ILLUMINATING DEVICE, WHEEL DETERIORATION DETECTING METHOD AND PROJECTOR

(71) Applicant: NEC Display Solutions, Ltd., Tokyo (JP)

(72) Inventor: Tomohiro Usami, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 0 days.

(21) Appl. No.: 15/508,060

(22) PCT Filed: Sep. 30, 2014

(86) PCT No.: PCT/JP2014/076196
§ 371 (c)(1),
(2) Date: Mar. 1, 2017

(87) PCT Pub. No.: WO2016/051537
PCT Pub. Date: Apr. 7, 2016

(65) Prior Publication Data
US 2017/0289511 A1    Oct. 5, 2017

(51) Int. Cl.
*H04N 9/31*    (2006.01)
*G02B 26/00*    (2006.01)

(52) U.S. Cl.
CPC ......... *H04N 9/3194* (2013.01); *G02B 26/008* (2013.01); *H04N 9/3105* (2013.01); *H04N 9/3155* (2013.01)

(58) Field of Classification Search
CPC .. G03B 21/204; G03B 21/206; G03B 21/208; G03B 21/2013; G03B 21/2053; H04N 9/3105; H04N 9/3155; H04N 9/3194
See application file for complete search history.

(56) References Cited

U.S. PATENT DOCUMENTS

2012/0188516 A1* 7/2012 Kashiwagi ............. G02B 7/006
                                                353/31
2013/0044347 A1    2/2013 Kitai et al.
(Continued)

FOREIGN PATENT DOCUMENTS

CN    101584572 A    11/2009
CN    102346365 A    2/2012
(Continued)

OTHER PUBLICATIONS

International Search Report (ISR) (PCT Form PCT/ISA/210), in PCT/JP2014/076196, dated Jan. 6, 2015.
(Continued)

*Primary Examiner* — Sultan Chowdhury
(74) *Attorney, Agent, or Firm* — McGinn I.P. Law Group, PLLC.

(57) ABSTRACT

An illuminating device includes: a light source emitting excitation light; a wheel including a wheel substrate transmitting the excitation light and an illuminating light generating member provided on the first surface of the wheel substrate to generate illuminating light by the excitation light; a photo detector, arranged on the second surface side that is opposite to the first surface of the wheel substrate, detects light that passed through the wheel; and a control unit that determines whether a defect or degeneration has occurred in the illuminating light generating member, based on the light detected by the photo detector.

20 Claims, 17 Drawing Sheets

(56) References Cited

U.S. PATENT DOCUMENTS

| | | | |
|---|---|---|---|
| 2013/0057661 A1 | 3/2013 | Oda | |
| 2013/0107230 A1* | 5/2013 | Murai | G03B 21/204 353/85 |
| 2015/0042963 A1* | 2/2015 | Nishimori | G03B 21/16 353/57 |
| 2015/0124431 A1* | 5/2015 | Motoya | G02B 26/008 362/84 |
| 2016/0050400 A1* | 2/2016 | Terasaki | H04N 9/3144 353/20 |
| 2016/0170199 A1* | 6/2016 | Inoue | G03B 21/14 348/761 |

FOREIGN PATENT DOCUMENTS

| | | |
|---|---|---|
| CN | 102385227 A | 3/2012 |
| JP | 2008-286872 A | 11/2008 |
| JP | 2009-086609 A | 4/2009 |
| JP | 2012-027106 A | 2/2012 |
| JP | 2012-047951 A | 3/2012 |
| JP | 2012-108486 A | 6/2012 |
| JP | 2013-054226 A | 3/2013 |
| JP | 2013-054332 A | 3/2013 |
| JP | 2013-118172 A | 6/2013 |

OTHER PUBLICATIONS

Japanese Office Action, dated Mar. 6, 2018, in Japanese Application No. 2016-551409 and English Translation thereof.
Chinese Office Action dated Jul. 3, 2018 in Chinese Application No. 201480081945.9 with an English translation thereof.

* cited by examiner

Luminance: low

Luminance: high

ILLUMINATING DEVICE, WHEEL DETERIORATION DETECTING METHOD AND PROJECTOR

TECHNICAL FIELD

The present invention relates to an illuminating device that generates illuminating light by excitation light and a projector using the same.

BACKGROUND ART

Patent Document 1 discloses an illuminating device using phosphors as light sources. FIG. 1 shows a configuration of the light source unit for the illuminating device.

Referring to FIG. 1, excitation light source 116 includes a plurality of blue laser diodes (LD). Blue excitation light output from excitation light source 116 is transformed into a parallel light flux by collimator lens array 106, then enters dichroic mirror 115. Excitation light source 116 is arranged so as to output S-polarized light to be incident on dichroic mirror 115. Dichroic mirror 115 is arranged so that the blue excitation light forms an incident angle of 45°. Herein, the incident angle is an angle formed between the incident light beam and the normal line at the incident point.

FIG. 2 shows the spectral transmission characteristics of dichroic mirror 115. The vertical axis represents transmittance and the horizontal axis represents wavelength (nm). The solid line shows the spectral transmission characteristics for S-polarization while the broken line represents the spectral transmission characteristics for P-polarization. The cutoff wavelength for S-polarization is 456 nm and the cutoff wavelength for P-polarization is 434 nm. Here, the cutoff wavelength is the wavelength at which the transmittance becomes 50%.

Dichroic mirror 115 has such characteristics for S-polarized light as to transmit light with wavelengths of above 456 nm and reflect light with wavelengths of less than 456 nm and has such characteristics for P-polarized light as to transmit light with wavelengths of above 434 nm and reflect light with wavelengths of less than 434 nm. The wavelength of blue excitation light is, for example 445 nm. The blue excitation light (S-polarization) from excitation light source 116 is reflected by dichroic mirror 115.

The blue excitation light (S-polarization) reflected by dichroic mirror 115 is converted into circular polarization as it passes through quarter-wave plate 108. The blue excitation light (circular polarization) having passed through quarter-wave plate 108 is focused on phosphor layer 103 by two condenser lenses 109a and 109b.

Phosphor layer 103 is formed on a circular wheel substrate. The wheel substrate is divided into first to third segments with respect to circular direction. Phosphor layer 103 includes a red phosphor area formed in the first segment and a green phosphor area formed in the second segment. The third segment is formed with a reflective mirror. As the wheel substrate rotates, the blue excitation light (circular polarization) is successively radiated on the first to third segments.

In the first segment the phosphor excited by blue excitation light emits red fluorescence. In the second segment the phosphor excited by blue excitation light emits green fluorescence. In the third segments blue excitation light (circular polarization) is reflected by the reflective mirror.

The red fluorescence from the first segment, the green excitation light from the second segment and the blue light (circular polarization) reflected by the reflective mirror of the third segment pass through condenser lenses 109a, 109b and quarter-wave plate 108 successively. In this process, the blue light (circular polarization) from the third segmentation is converted into P-polarization as it passes through quarter wave plate 108. The red fluorescence, green fluorescence and blue light (P-polarization) each pass through dichroic mirror 115. The light (red light, green light and blue light) that passed through dichroic mirror 115 is used as the output light (illuminating light) of the illuminating device.

In general, a metal plate is used as the wheel substrate. Phosphor layer 103 and the reflective mirror are welded to the metal plate by using adhesives.

FIG. 3 is a schematic diagram showing one example of a phosphor wheel in which the phosphor layer and the reflective mirror are welded on the metal plate by use of an adhesive. FIG. 4 is a developed perspective view of the phosphor wheel shown in FIG. 3.

As shown in FIGS. 3 and 4, phosphor layer 103 and reflective mirror 104 have arced configurations and are formed on metal plate 105 as the wheel substrate. Phosphor layer 103 and reflective mirror 104 are welded to metal plate 105 by an adhesive.

LITERATURE OF THE PRIOR ART

Patent Documents

Patent Document 1: JP2012-108486A

DISCLOSURE OF THE INVENTION

Due to aged degradation of the adhesive, part of phosphor layer 103 and reflective mirror 104 may peel off from metal plate 105. Further, when excitation light is radiated on phosphor layer 103, the illuminated part of phosphor layer 103 generates heat, which may deteriorate the adhesive and possibly induce phosphor layer 103 to peel off from metal plate 105.

Since the peeled or defective part cannot emit output light for the light source device even though excitation light is radiated, this will cause flickering and change the ratio between color components of light (red, green and blue) contained in the output light for one revolution of the phosphor wheel. A defect of the phosphor wheel means deterioration of the phosphor wheel and a defective site is a deteriorated site.

Also, part of phosphor layer 103 and reflective mirror 104 may change in quality over time due to the influence of light, heat generation and the like. In this degenerated site, since excitation light passes through the degenerated site, it is not possible to provide pertinent output light for the light source device. Therefore, similarly to the aforementioned defective site, a degenerated site brings about flickering and a change in the color ratio. Degeneration of the phosphor wheel means deterioration of the phosphor wheel and a degenerated site is a deteriorated site.

Since flickering and a change in the color ratio usually take place due to various reasons attributed to other components than the phosphor wheel, it is difficult to identify the causes of flickering and change in the color ratio. If defective sites and/or degenerated sites of phosphor layer 103 and reflective mirror 104 can be detected, it is possible to identify the cause of flickering and change in the color ratio.

In the illuminating device according to Patent Document 1, it is difficult to identify the cause of flickering and/or change in the color ratio because defective sites in phosphor layer 103 and the reflective mirror cannot be detected.

Here, by detecting, of the light that comes from phosphor layer 103 and reflective mirror 104 toward condenser lenses 109a and 109b, light that passed through condenser lenses 109a and 109b (effective light) by the optical sensor, it is possible to detect a defective site or degenerated site in phosphor layer 103 and reflective mirror 104. However, this method entails the problem that the luminance of the output light from the light source device becomes lower and light utilization efficiency also becomes lower.

Alternatively, by detecting, of light that comes from phosphor layer 103 and reflective mirror 104 toward condenser lenses 109a and 109b, light other than the effective light (non-effective light) by the optical sensor, it is possible to detect a defective site or degenerated site in phosphor layer 103 and reflective mirror 104. Because the luminance of the non-effective light is markedly low compared to the luminance of the effective light, it is necessary to dispose the optical sensor in proximity to the phosphor wheel in order to detect a defective site or degenerated site with precision. However, because condenser lens 109 is arranged to be close to the phosphor wheel, it is thus difficult to dispose an optical sensor in close proximity to the phosphor wheel.

The object of the present invention is to provide an illuminating device capable of detecting deterioration of illuminating light generating elements such as phosphor layers, reflective mirrors and others and a method of detecting wheel deterioration.

Another object of the present invention is to provide a projector equipped with the above illuminating device.

In order to achieve the above objects, one aspect of the present invention provides an illuminating device, comprising:
a light source that emits excitation light;
a wheel that includes a wheel substrate through which the excitation light is transmitted and an illuminating light generating member that is provided on a first surface of the wheel substrate to generate illuminating light by the excitation light;
a photo detector that is arranged on a second surface side that is opposite to the first surface of the wheel substrate to detect light that passed through the wheel; and,
a control unit that determines whether a defect or degeneration has occurred in the illuminating light generating member, based on the light detected by the photo detector.

Another aspect of the present invention provides a wheel deterioration detecting method of detecting deterioration of a wheel that includes: a wheel substrate that transmits excitation light; and an illuminating light generating member which is provided on a first surface of the wheel substrate to generate illuminating light by the excitation light, the method comprising:
using a photo detector which is arranged on a second surface side that is opposite to the first surface of the wheel substrate to detect light that passed through the wheel; and,
determining whether a defect or degeneration has occurred in the illuminating light generating member, based on the light that is detected by the photo detector.

In order to achieve the above other object, one aspect of the present invention provides a projector comprising:
the above illuminating device;
an image forming unit that modulates illuminating light from the illuminating device based on an input video signal to form an image; and
a projection optics that projects the image that is formed by the image forming unit.

DESCRIPTION OF EMBODIMENT

Next, exemplary embodiments of the present invention will be described with reference to the drawings.
(First Exemplary Embodiment)

Figure 5:
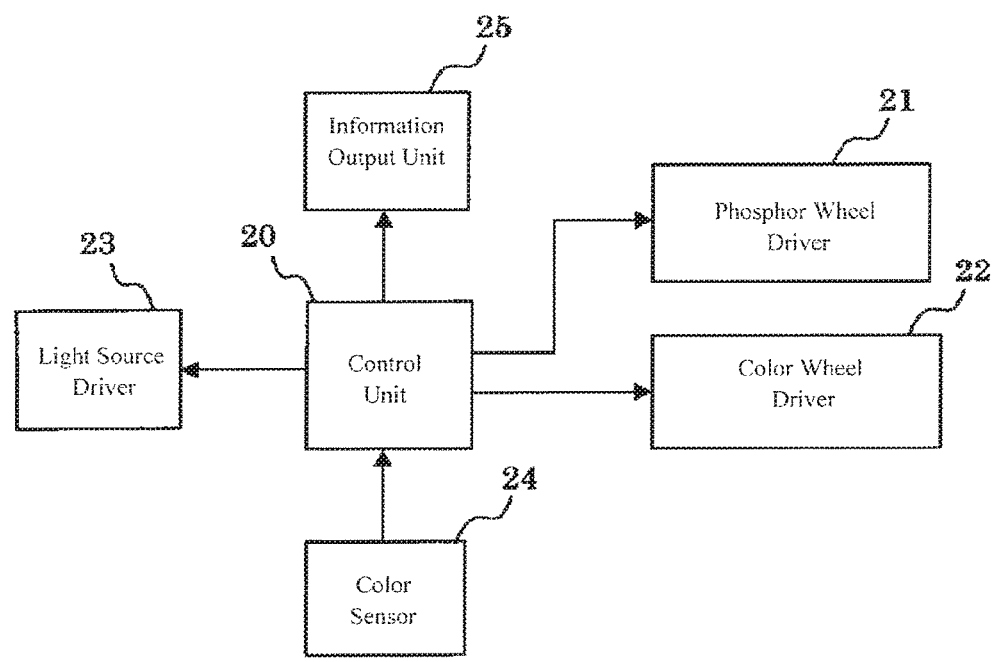
FIG. 5 A block diagram showing a configuration of an illuminating device as the first exemplary embodiment of the present invention.
Figure 6:
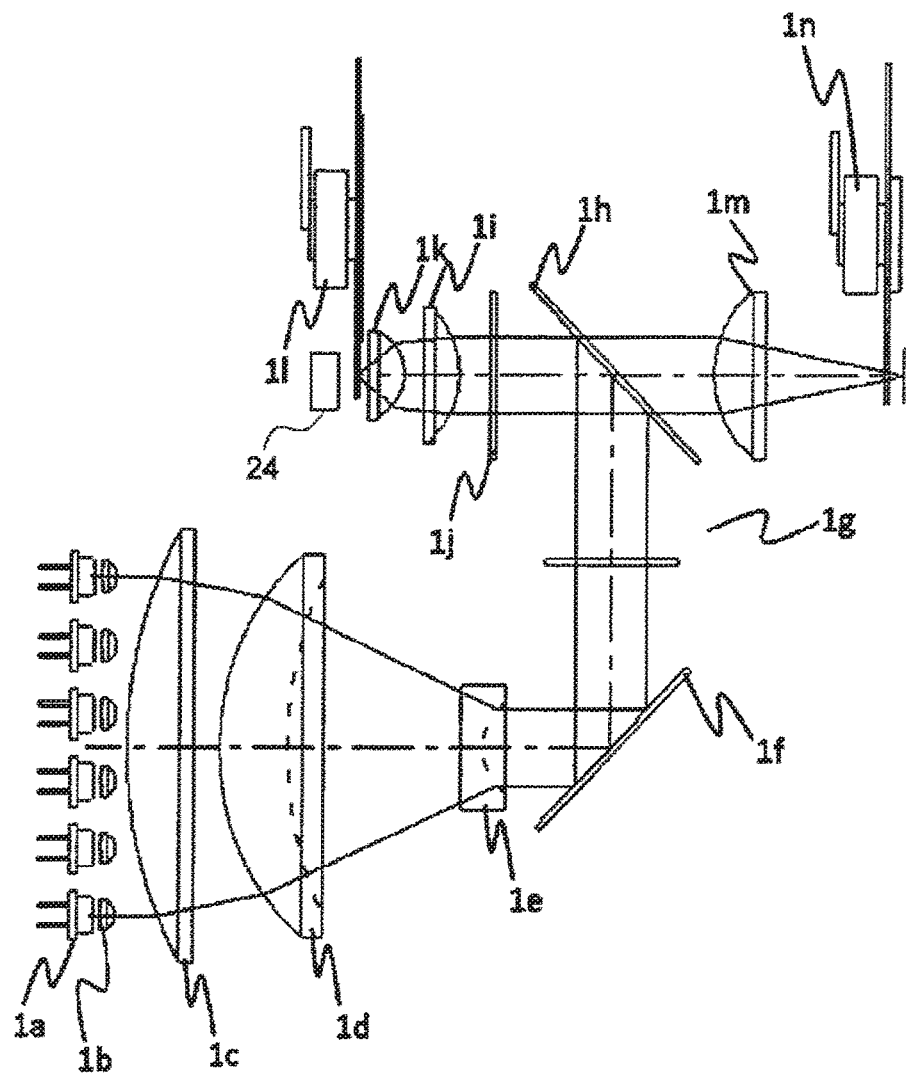
FIG. 6 A schematic diagram showing one example of a light source unit of an illuminating device as the first exemplary embodiment of the present invention.

FIG. 5 is a block diagram showing a configuration of an illuminating device as the first exemplary embodiment of the present invention. FIG. 6 is a schematic diagram showing one example of a light source unit of the illuminating device.

Referring first to FIG. 6, the configuration of the light source unit of the illuminating device will be described.

Referring to FIG. 6, the light source unit of illuminating device 1 includes light sauce 1a, collimator lenses 1b, lenses 1c to 1e, 1i, 1k, 1m, polarizing beam splitter 1f, diffuser 1g, dichroic mirror 1h, quarter-wave plate 1j, phosphor unit 1l, color filter unit 1n and color sensor 24.

Light source 1a is formed of blue laser diodes (LD) emitting blue light having a peak wavelength in the blue wavelength range. For example, light source 1a is composed of blue LDs arranged in a 6×4 grid. Here, the number of blue LDs is not limited to 24. The number of blue LDs may be either increased or decreased as necessary.

Collimator lens 1b is provided for each blue LD and converts the blue light emitted from the blue LD into parallel light beams.

Lenses 1c to 1e convert blue light (incident beam) that enters these lenses 1c to 1e through collimator lenses 1b from light source 1a, into a parallel light flux having a reduced diameter. Reducing the diameter of the outgoing light flux instead of that of the incident light flux makes it possible to make the elements that are arranged downstream of lenses 1c to 1e smaller in size. Although three lenses 1c to 1e are used in this case, the number of lenses is not limited to three. The number of lenses may be either increased or decreased as necessary.

Blue light outgoing from lenses 1c to 1e enters dichroic mirror 1h through polarizing beam splitter 1f. Arranged on the light path between polarizing beam splitter 1f and dichroic mirror 1h is diffuser 1g. Diffuser 1g diffuses the blue light from polarizing beam splitter 1f. The diffusion angle is as much as 3 deg., for example. Here, the diffusion angle is the angle formed between the light ray passing the center of the light flux (central light ray) and the light ray passing the outermost of the light flux.

Polarizing beam splitter 1f has a characteristic of splitting light into S-polarization and P-polarization. Herein, polarizing beam splitter 1f has a characteristic of reflecting S-polarized light and transmitting P-polarized light while light source 1a is arranged so that the output light (blue light) enters beam splitter 1f in S-polarization state. A polarizing plate or dichroic mirror can be used as polarizing beam splitter 1f.

Figure 2:
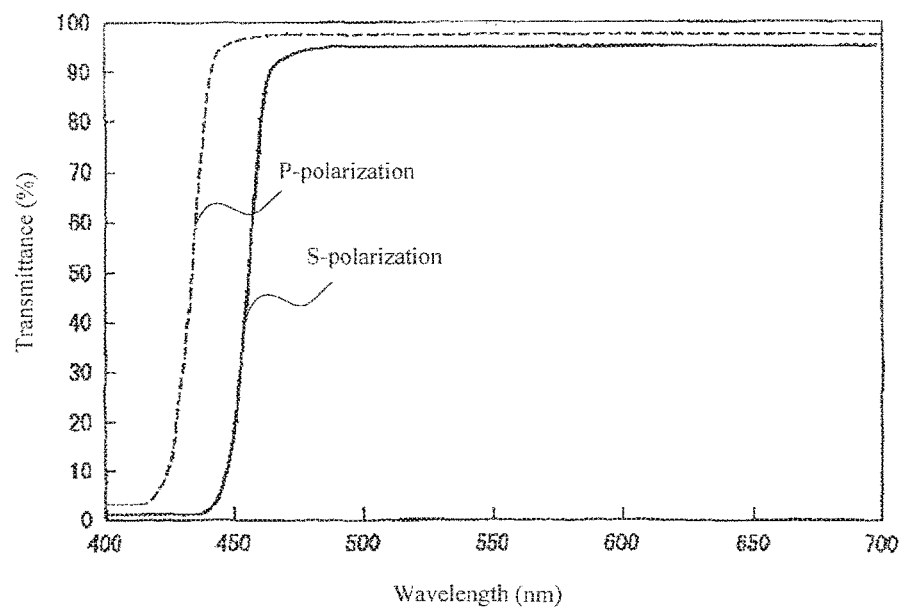
FIG. 2 A characteristic chart showing the spectral transmission characteristics of a dichroic mirror of the illuminating device shown in FIG. 1.
Figure 3:
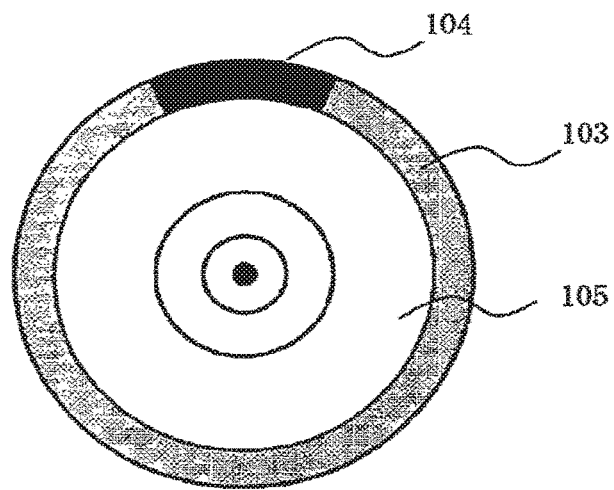
FIG. 3 A schematic diagram showing one example of a phosphor wheel.
Figure 4:
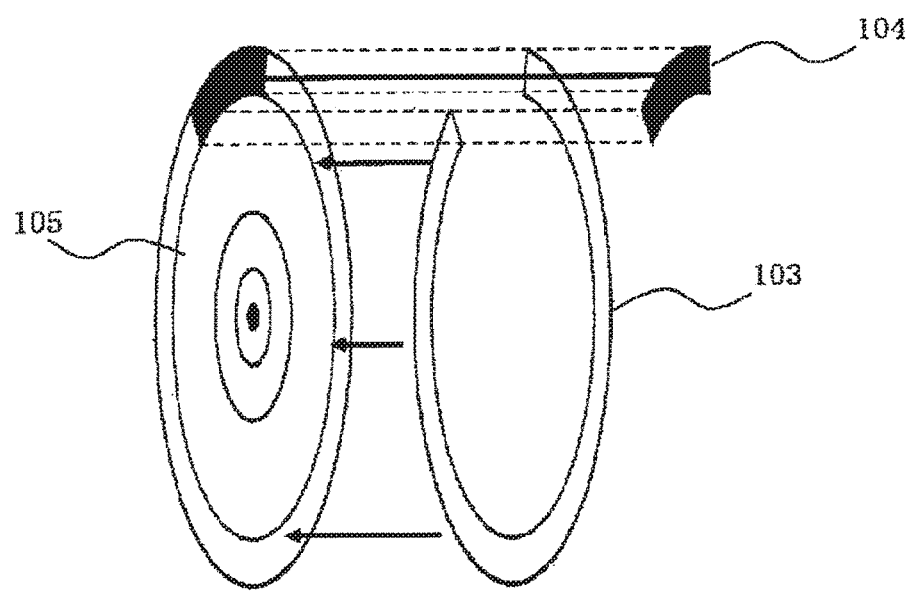
FIG. 4 A developed perspective view showing the phosphor wheel shown in FIG. 3.

The blue light (S-polarization) reflected on polarizing beam splitter 1f enters dichroic mirror 1h. Dichroic mirror 1h has such a characteristic as to, for the light incident in S-polarization state, transmit light having wavelengths equal to or greater than a first wavelength that is longer than the wavelength of light source 1a (the wavelength of blue light) and reflect light having wavelengths shorter than the first wavelength. Dichroic mirror 1h also has a characteristic such as to, for the light incident in P-polarization state, transmit light having wavelengths equal to or greater than a second wavelength that is shorter than the wavelength of light source 1a (the wavelength of blue light) and reflect light having wavelengths shorter than the second wavelength. The example of the characteristics is that shown in FIG. 2. Dichroic mirror 1h can be realized by a dielectric multi-layered membrane.

Dichroic mirror 1h conducts the blue light (Step-polarization) from dichroic mirror 1h to phosphor unit 1l. Arranged on the light path between dichroic mirror 1h and phosphor unit 1l are quarter-wave plate 1j and lenses 1i and 1k.

Figure 7:
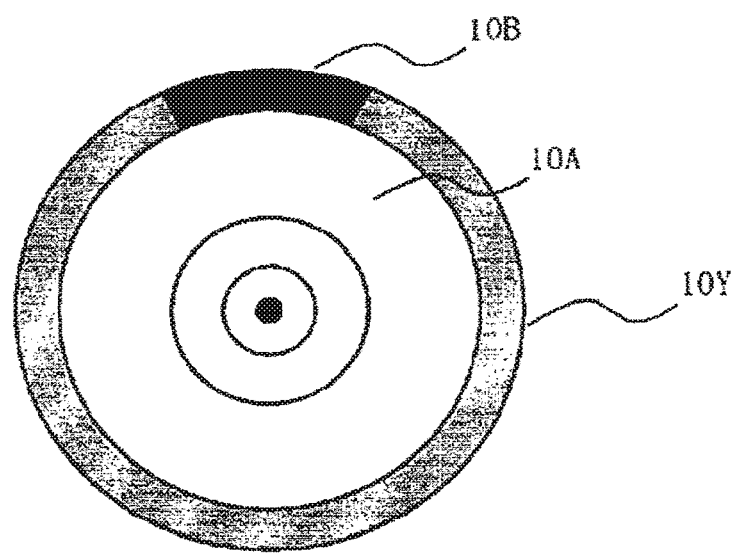
FIG. 7 A schematic diagram showing one example of a phosphor wheel of the light source unit shown in FIG. 6.

Phosphor unit 1l includes a phosphor wheel and a driver (motor) rotating the phosphor wheel. FIG. 7 shows one example of the phosphor wheel.

Referring to FIG. 7, the phosphor wheel includes wheel substrate 10A that transmits light in a predetermined wavelength range containing the wavelength of light source 1a. Yellow phosphor element 10Y and reflective element 10B are formed on the circumferential surface of wheel substrate 10A. Yellow phosphor element 10Y and reflective element 10B are illuminating light generating member, which is welded on wheel substrate 10A with an adhesive. Wheel substrate 10A is transparent to, at least, the wavelength of the excitation light, and is preferably formed of a material whose thermal conductivity is excellent. For example, wheel substrate 10A may be formed of quartz, glass or the like. The phosphor wheel includes a rotor cup unit that connects wheel substrate 10A with the rotational shaft of the driver (motor).

Reflective element 10B reflects blue light from light source 1a. The reflected blue light is the illuminating light. Yellow phosphor element 10Y contains a phosphor that emits yellow fluorescence as it is excited by excitation light. The yellow phosphor can be excited by the blue light from light source 1a. The yellow fluorescence contains a range of wavelengths from green to red. The yellow fluorescence is the illuminating light.

Phosphor unit 1l emits illuminating light to the side where yellow phosphor element 10Y and reflective element 10B are arranged, with respect to the phosphor wheel.

The area ratio between yellow phosphor element 10Y and reflective element 10B in the circumferential direction (the division ratio in the circumferential direction) is determined as appropriate depending on the luminance balance of red light, green light and blue light contained in the output light of the light source unit.

Lenses 1i and 1k form a condenser lens group that condenses the blue light from dichroic mirror 1h onto the phosphor wheel of phosphor unit 1l. Although, in this exemplary embodiment, the condenser lens group is formed of two lenses 1i and 1k, the lens group is not limited to this. The condenser lens group may be formed of three or more lenses.

Quarter-wave plate 1j creates a phase shift with respect to the incident light. Quarter-wave plate 1j is disposed between lens 1i and dichroic mirror 1h. The blue light (Step-polarization) from dichroic mirror 1h is converted to circular polarization by passing through quarter-wave plate 1j. The blue light (circular polarization) that passed through quarter-wave plate 1j is radiated on the phosphor wheel via lenses 1i and 1k.

By rotating the phosphor wheel, the blue light (circular polarization) from lens 1k successively irradiates yellow phosphor element 10Y and reflective element 10B. In yellow phosphor element 10Y, the yellow phosphor excited by the blue light emits yellow fluorescence. In reflective element 10B, the blue light from lens 1k is reflected toward lens 1k.

Yellow fluorescence (unpolarized light) from yellow phosphor element 10Y and blue fluorescence (circularly polarized light) as the reflected light from reflective element 10B each pass through lenses 1k, 1i, quarter-wave plate 1j successively, entering dichroic mirror 1h. In this process, blue light (circularly polarized light) from reflective element 10B is converted to P-polarized light as it passes through quarter-wave plate 1j. This blue light (P-polarization) enters dichroic mirror 1h.

Yellow fluorescence (unpolarized light) and blue light (P-polarization) pass through dichroic mirror 1h. The yellow fluorescence and blue light that passed through dichroic mirror 1h are condensed on one end face of an unillustrated optical element (e.g., uniformizing optical element such as a light tunnel, rod integrator or the like) by means of lens 1*m*.

Color filter unit 1*n* includes a color wheel, a driver (motor) that rotates the color wheel and a detector that detects rotation timing of the color wheel. This color wheel is disposed at lens 1*m* side with respect to the focal point of lens 1*m*.

Figure 8:
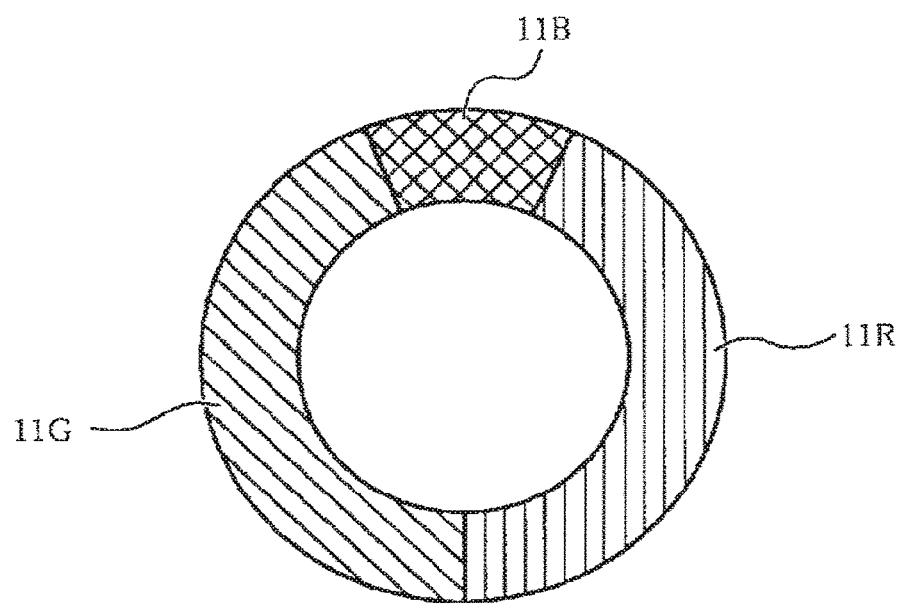
FIG. 8 A schematic diagram showing one example of a color wheel of the light source unit shown in FIG. 6.

FIG. 8 shows one example of a color wheel. Referring to FIG. 8, the color wheel includes red-pass filter 11R, green-pass filter 11G and diffuser 11B. Red-pass filter 11R, green-pass filter 11G and diffuser 11B are arranged side by side along the circumferential direction.

The areas of red-pass filter 11R and green-pass filter 11G correspond to yellow phosphor element 10Y of the phosphor wheel shown in FIG. 7 while diffuser 11B corresponds to reflective element 10B of the phosphor wheel shown in FIG. 7. The area ratio in the circumferential direction between the areas of red-pass filter 11R and green-pass filter 11G and the area of diffuser 11B is the same as the area ratio between yellow phosphor element 10Y and reflective element 10B in the circumferential direction.

Color filter unit 1*n* and phosphor unit 1*l* are configured to rotate in synchronization with each other. The yellow fluorescence from yellow phosphor element 10Y contains light in the wavelength range from green to red. Red light passes through red-pass filter 11R and green light passes through green-pass filter 11G. The blue light from reflective element 10B passes through diffuser 11B. Diffused blue light is emitted from diffuser 11B. The diffusion angle is, for example, about 10°, but can be changed as appropriate, as required.

The red light, green light and blue light that passed through color filter unit 1*n* form the output light (illuminating light) of the light unit of the illuminating device.

Color sensor 24 is arranged on the opposite side across the phosphor wheel from that of lens 1*k*. Color sensor 24 detects light transmitted through the phosphor wheel.

Referring next to FIG. 5, the configuration relating to detection of phosphor wheel deterioration will be described.

Referring to FIG. 5, the illuminating device includes control unit 20, phosphor wheel driver 21, color wheel driver 22, light source driver 23, color sensor 24 and information output unit 25.

Phosphor wheel driver 21 includes a driver (motor) that rotates the phosphor wheel of phosphor unit 1*l*. Color wheel driver 22 includes a driver (motor) that rotates the color wheel of color filter unit 1*n*. These phosphor wheel driver 21 and color wheel driver 22 operate in accordance with instructions from control unit 20.

Light source driver 23 drives light source 1*a* in accordance with instructions from control unit 20. Specifically, light source driver 23 supplies a predetermined voltage or a predetermined current to light source 1*a*. Color sensor 24 detects the light that passed through the phosphor wheel and outputs a signal representing the detection result (e.g., light intensity). The output signal from color sensor 24 is supplied to control unit 20.

Information output unit 25 outputs deterioration information representing deterioration of the phosphor wheel. The deterioration information may include, for example, information that indicates that deterioration of the phosphor wheel has occurred, information corresponding to the position of deterioration and the like. The deterioration of the phosphor wheel means a state in which a defect or degeneration has taken place in yellow phosphor element 10Y or reflective element 10B. Information output unit 25 may be any form as long as it can output deterioration information and the like. For example, a display device such as liquid crystal display, a speaker, light emitting devices such as LEDs (Light Emitting Diode) may be used as information output unit 25. When deterioration information and the like are given through a network, the communication unit connected to the network can be used as information output unit 25. When the illuminating device of the present exemplary embodiment is applied to a display apparatus such as a projector or the like, information output unit 25 outputs deterioration information and the like so as to cause the image forming unit having a display function of the display apparatus itself to form an image. In this case, the image forming unit of the display apparatus forms an image corresponding to the deterioration information.

Control unit 20 controls light source unit 23 as well as controlling phosphor wheel driver 21 and color wheel driver 22 so that the color wheel and the phosphor wheel rotate in synchronization with each other.

Control unit 20 also detects deterioration of the phosphor wheel based on the output signal from color sensor 24. Specifically, control unit 20 detects a defective site or degenerated site in yellow phosphor element 10Y or reflective element 10B on wheel substrate 10A shown in FIG. 7.

Figure 9A:
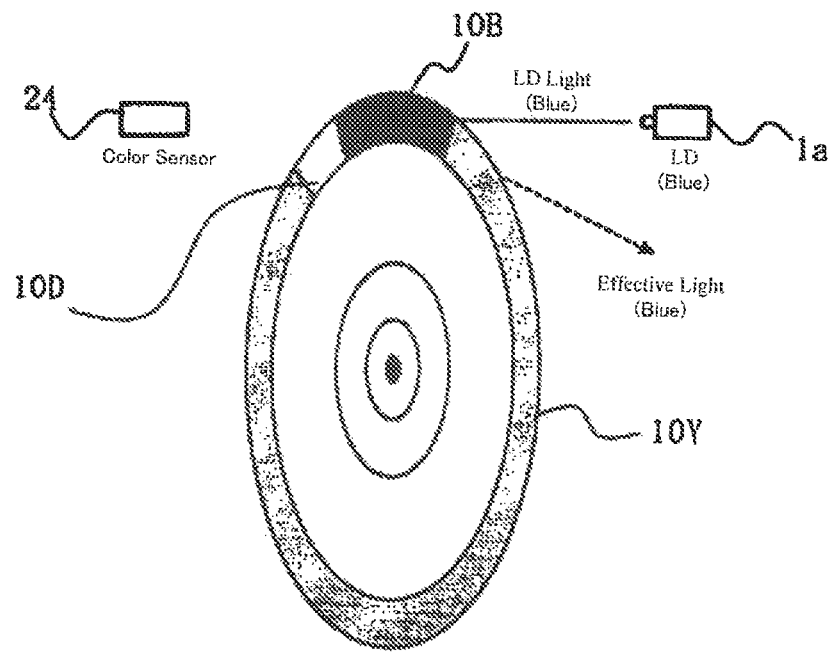
FIG. 9A A diagram for illustrating an operation of detecting a defective site of yellow phosphor element on the phosphor wheel shown in FIG. 7.
Figure 9B:
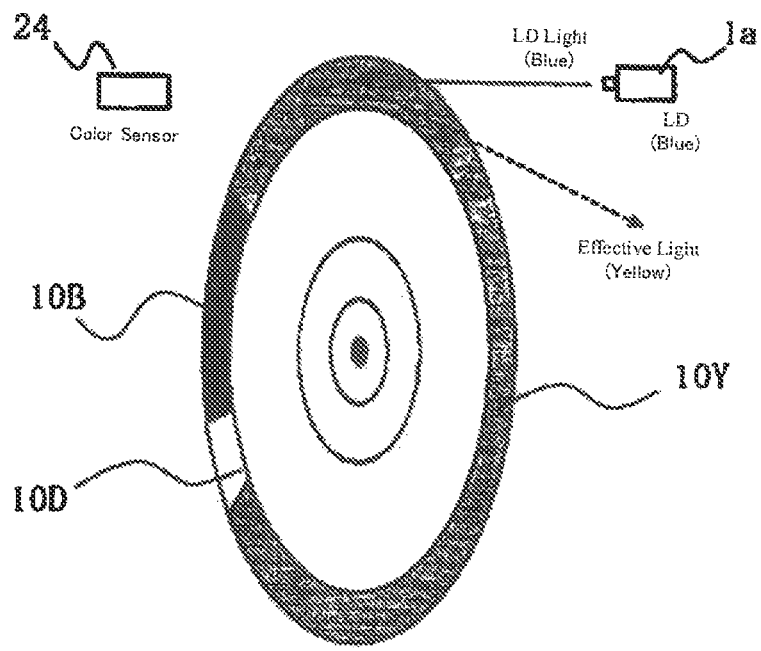
FIG. 9B A diagram for illustrating an operation of detecting a defective site of yellow phosphor element on the phosphor wheel shown in FIG. 7.
Figure 9C:
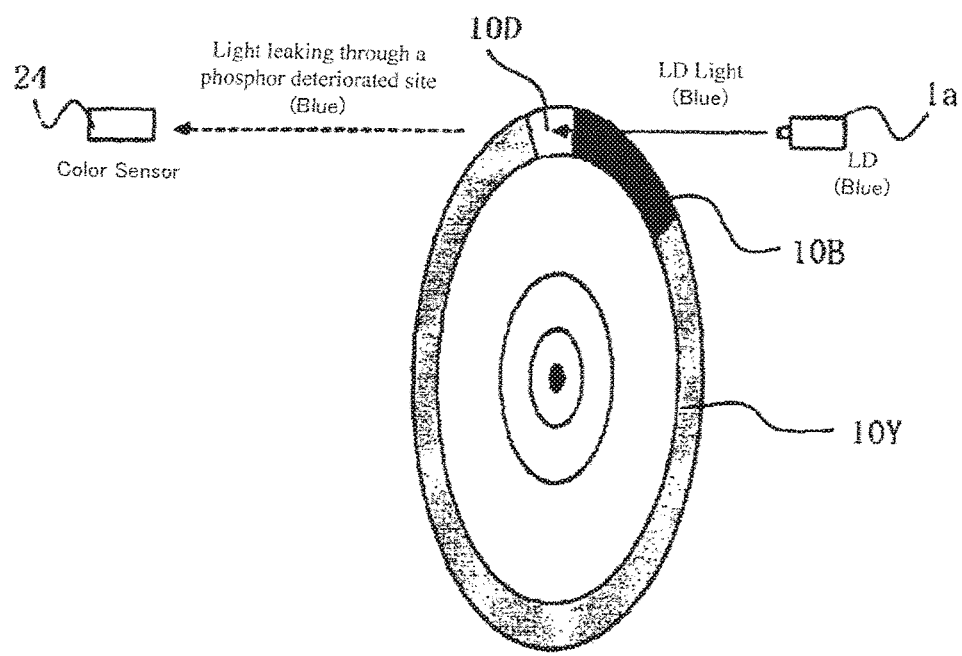
FIG. 9C A diagram for illustrating an operation of detecting a defective site of yellow phosphor element on the phosphor wheel shown in FIG. 7.

FIGS. 9A to 9C are diagrams for illustrating an operation of detecting a defective site in yellow phosphor element 10Y.

As shown in FIG. 9A, when excitation light from light source 1*a* is radiated on reflective element 10B, the excitation light is reflected by reflective element 10B. In this case, no excitation light is supplied to color sensor 24.

As shown in FIG. 9B, when excitation light from light source 1*a* is radiated on yellow phosphor element 10Y, the phosphor is excited by the excitation light so as to emit yellow fluorescence. The yellow fluorescence is radiated toward the light source 1*a* side (the lens 1*k* side) and the color sensor 24 side. Also, part of the excitation light (the excitation light that has not been used for excitation of the phosphor) passes through the phosphor wheel to be supplied to color sensor 24. Color sensor 24 receives yellow fluorescence and part of the excitation light. The intensity of received light is determined depending on the characteristics of the phosphor wheel, the phosphor and other factors.

As shown in FIG. 9C, when excitation light from light source 1*a* is radiated on defective site 10D, the excitation light passes through the phosphor wheel and is supplied to color sensor 24. In this case, the luminance of the excitation light incident on color sensor 24 is sufficiently high compared to the luminance of the excitation light incident on color sensor 24 in the condition shown in FIG. 9B.

If excitation light incident on color sensor 24 in the condition shown in FIG. 9C can be distinguished from the light incident on color sensor 24 in the other states, it is possible to detect the size of defective site 10D based on the output signal from color sensor 24. For example, a filter having characteristics of transmitting light in the wavelength range of blue color and absorbing light in the other wavelength ranges is arranged on the photo-reception surface of color sensor 24. This arrangement makes color sensor 24 receive excitation light (blue light) only. In addition, a threshold is set for the output of color sensor 24. This threshold is a value that is higher than the luminance of excitation light incident on color sensor 24 in the condition shown in FIG. 9B and smaller than the luminance of excitation light incident on color sensor 24 in the condition shown in FIG. 9C. With this arrangement, it is possible to detect defective site 10D based on the output signal from color sensor 24.

Figure 10:
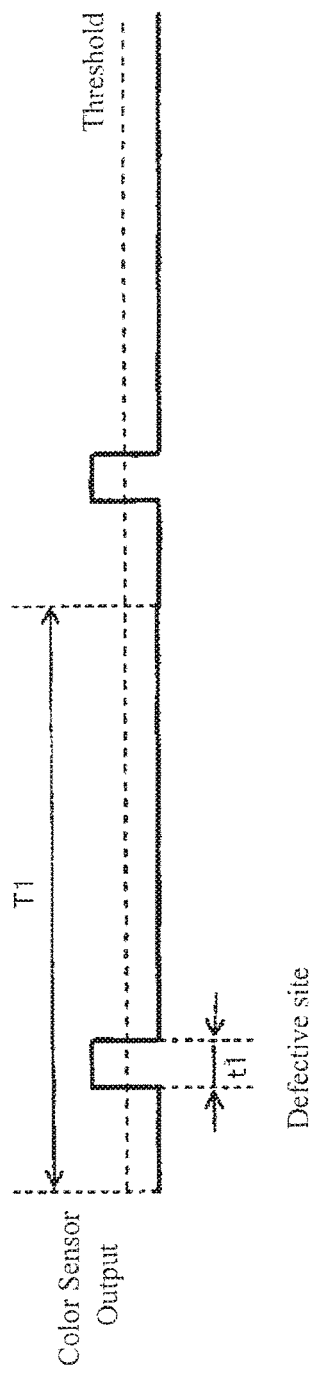
FIG. 10 A waveform diagram showing one example of an output signal from a color sensor when a threshold is set.

FIG. 10 shows one example of an output signal from color sensor 24 when the aforementioned threshold is set. In FIG. 10, time period T1 is a period in which the phosphor wheel makes one revolution. In this time period T1, duration t1 in which the signal level is equal to or higher than the threshold corresponds to the condition shown in FIG. 9C. In the durations corresponding to the conditions shown in FIGS. 9A and 9B, when excitation light is radiated on reflective element 10B and when excitation light is radiated on yellow phosphor element 10Y as shown in FIGS. 9A and 9B, the output signal from color sensor 24 varies. However, since the change is smaller than the threshold, the change is unillustrated in FIG. 10 for convenience sake. Thus, control unit 20 can determine whether or not a defect has occurred based on the signal level of light detected by color sensor 24. Further, control unit 20 can determine the size of defective site 10D based on the detected time t1.

Similar to defective site 10D, a degenerated site also has the conditions like those shown in FIGS. 9A to 9C, so that control unit 20 can detect the degenerated site based on the output signal from color sensor 24 shown in FIG. 10.

Detecting defective site 10D or a degenerated site, control unit 20 makes information output unit 25 output deterioration information indicating deterioration of the phosphor wheel.

As described above, according to the illuminating device of the present exemplary embodiment, it is possible to detect deterioration (defect or degeneration) of the phosphor wheel. Further, since color sensor 24 is laid out on the rear side of the phosphor wheel, color sensor 24 will not block valid light.

Further, since information output unit 25 outputs deterioration information when deterioration (defect or degeneration) of the phosphor wheel is detected, it is possible to notify the deterioration of the phosphor wheel to the user or person in charge of repair.

The illuminating device of the present exemplary embodiment is one example of the present invention, and the configuration can be changed as appropriate.

Next, variational examples will be described.

When a defective site or degenerated site is small, there is a case where it is not necessary to output deterioration information because the influence on the image quality is small. Taking this into account, deterioration information may be output only when the size of a defective site or degenerated site is greater than a predetermined size. Specifically, control unit 20 determines whether or not duration t1 of the output signal from color sensor 24 shown in FIG. 10 is equal to or longer than a predetermined time. If duration t1 is equal to or greater than the predetermined time, control unit 20 determines that a defective site or degenerated site has occurred and causes information output unit 25 to issue deterioration information. When duration t1 is shorter than the predetermined time, information output unit 25 will not output any deterioration information.

Since defective sites and degenerated sites will not give effective light (illuminating light) even if excitation light is radiated thereon, it is possible to prevent wasteful power consumption and improve light use efficiency by not irradiating the defective sites and degenerated sites with excitation light. Taking this into account, control unit 20 may be adapted to detect duration t1 of the output signal from color sensor 24 shown in FIG. 10 and control light source driver 23 so as to turn off light source 1a in duration t1 and so as to turn on light source 1a in the period other than duration t1. Here, the time, in which light source 1a is turned off, may be obtained by adding a predetermined time margin before and/or after duration t1. In other words, the time range of setting light source 1a off is a predetermined time range including the deteriorated site on the phosphor wheel substrate.

Figure 1:
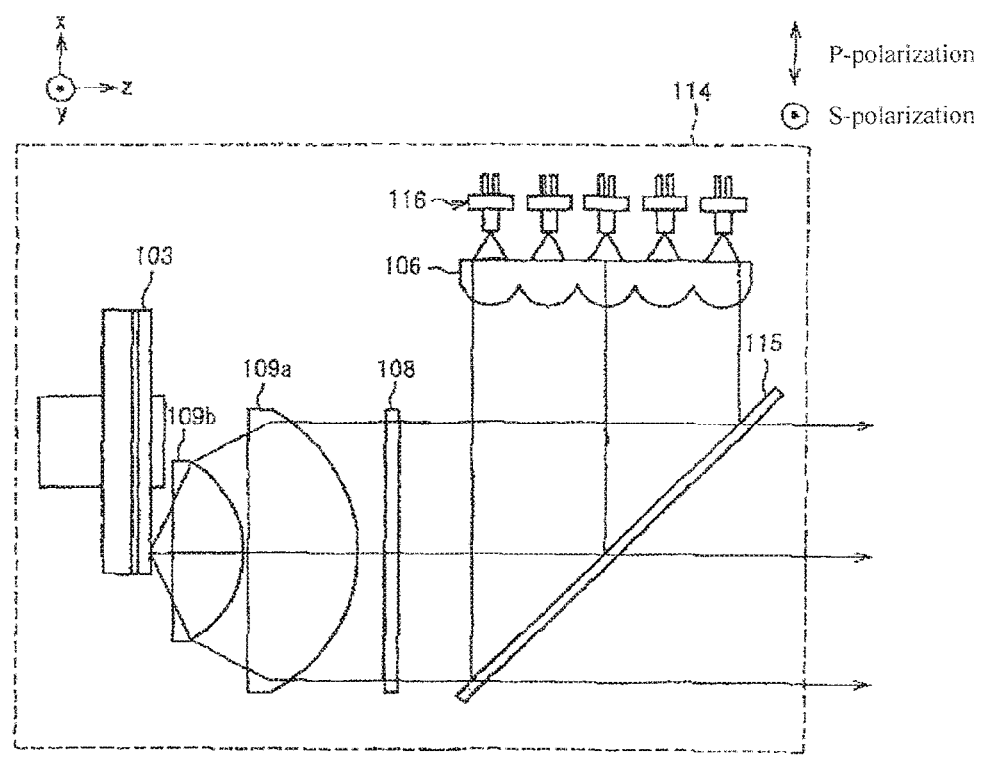
FIG. 1 A schematic diagram showing a configuration of a light source unit of an illuminating device according to Patent document 1.

Instead of the light source unit shown in FIG. 6, the configuration shown in FIG. 1 can also be used. In this case, color sensor 24 is disposed on the rear side of the phosphor wheel having phosphor layer 103 (on the opposite side of the phosphor layer 103 side). Also in this case, the wheel substrate of the phosphor wheel uses a material that transmits light in a wavelength range containing the wavelength of the excitation light. Control unit 20 obtains a signal shown in FIG. 10 from color sensor 24 and detects a defective site or degenerated site of phosphor layer 103, based on that signal.

In the phosphor wheel shown in FIG. 7, instead of yellow phosphor element 10Y and reflective element 10B, a red phosphor element, green phosphor element, blue phosphor element may be used. The red phosphor element contains a phosphor that is excited by excitation light to emit red fluorescence. The green phosphor element contains a phosphor that is excited by excitation light to emit green fluorescence. The blue phosphor element contains a phosphor that is excited by excitation light to emit blue fluorescence. In this case, control unit 20 may be adapted to determine in which of the red phosphor element, green phosphor element and blue phosphor element a defective site has occurred and to control light output of light source 1a so as to lower the luminance of the excitation light radiated on the phosphor elements other than the phosphor element involving the defective site.

(Second Exemplary Embodiment)

Figure 11:
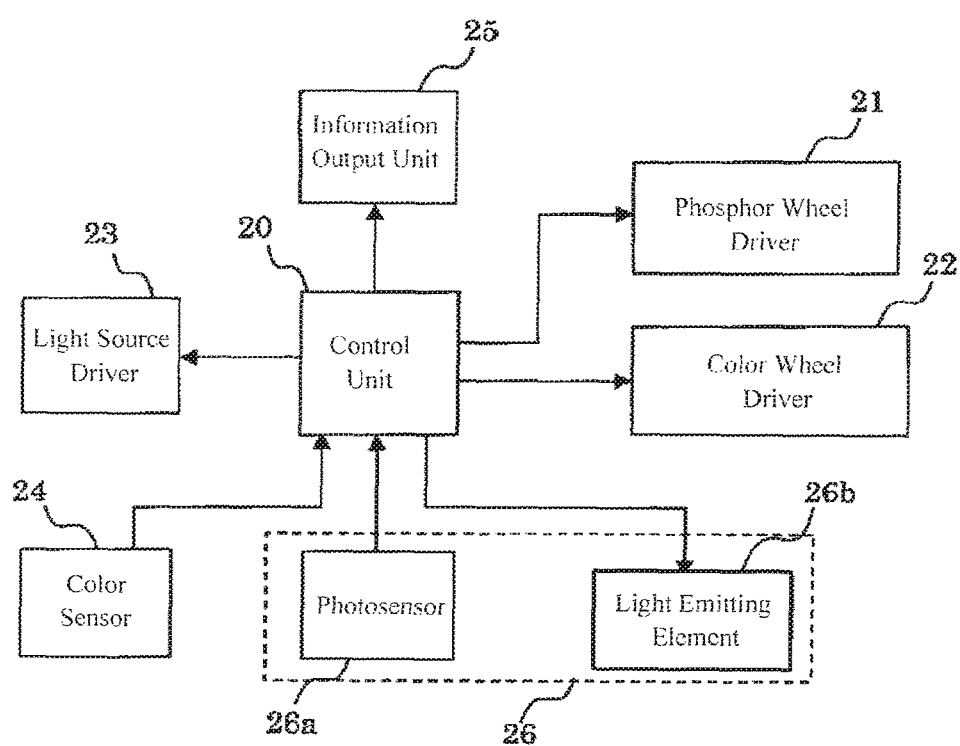
FIG. 11 A block diagram showing a configuration of an illuminating device as the second exemplary embodiment of the present invention.

FIG. 11 is a block diagram showing a configuration of an illuminating device as the second exemplary embodiment of the present invention. The illuminating device of this exemplary embodiment includes timing detector 26 in addition to the components illustrated in the first exemplary embodiment. The components other than timing detector 26 are the same as those described in the first exemplary embodiment, so that detailed description of these components are omitted.

Timing detector 26 detects rotation timing of the phosphor wheel. Control unit 20, based on the signal representing rotation timing of the phosphor wheel issued from timing detector 26 and the output signal from color sensor 24, identifies the position of a deteriorated site (defective site or degenerated site) on the phosphor wheel.

Figure 12A:
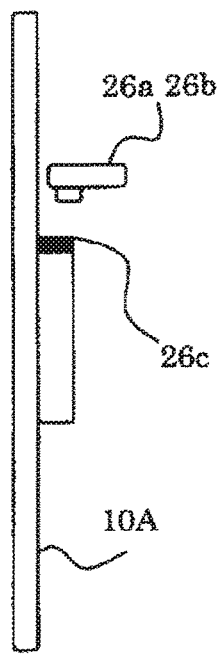
FIG. 12A A schematic diagram of a timing detector of the illuminating device shown in FIG. 11, viewed sidewise.
Figure 12B:
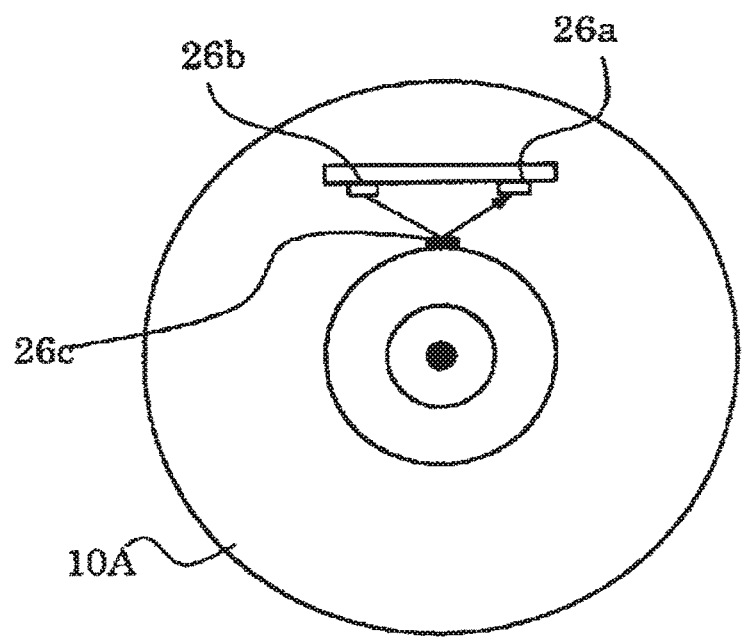
FIG. 12B A schematic diagram of a timing detector of the illuminating device shown in FIG. 11, viewed from the front.

FIGS. 12A and 12B show one example of timing detector 26. Referring to FIGS. 12A and 12B, timing detector 26 includes photosensor 26a, light emitting element 26b and reflective mark 26c. Reflective mark 26c is one example of a detection mark. Reflective mark 26c is used to detect rotation timing of wheel substrate 10A.

Reflective mark 26c is arranged at a position where the rotation timing of the phosphor wheel can be detected. Reflective mark 26c is provided for the phosphor wheel and moves on a predetermined track in accordance with rotation of the phosphor wheel. For example, reflective mark 26c is provided on a rotor cup portion. The rotor cup portion may be formed of a reflective material having a high light reflectance while reflective mark 26c may be formed by applying a low light reflective tape or the like as an index marking at a predetermined position (reference position) of the rotor cup portion. Moreover, the rotor cup portion may be formed of a reflective material having a low light reflectance while reflective mark 26c may be formed by applying a high light reflective tape or the like as an index marking. Reflective mark 26c can also be formed on wheel substrate 10A. Reflective mark 26c provided for the rotating shaft of the driver (motor) for turning the phosphor wheel may be regarded as part of the phosphor wheel.

Light emitting element 26b irradiates the track of reflective mark 26c with light. Light emitting element 26b is formed of, for example, an LED or the like. Photosensor 26a detects reflected light from reflective mark 26c. The output signal from photosensor 26a is supplied to control unit 20.

Control unit 20 identifies the positions of defective sites and/or degenerated sites in yellow phosphor element 10Y and reflective element 10B on wheel substrate 10A, based on the output signal from photosensor 26a and the output signal from color sensor 24.

Figure 13:
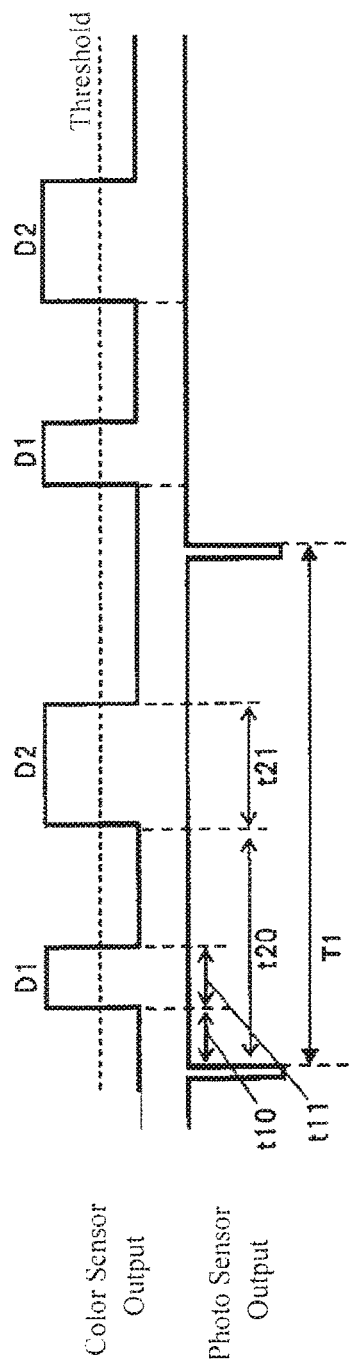
FIG. 13 A waveform diagram showing one example of output signals from a photo sensor and a color sensor.

FIG. 13 shows outputs from photosensor 26a and color sensor 24 as one example. Time period T1 from the rising timing of the output signal of photosensor 26a to the next rising timing is the period during which wheel substrate 10A makes one revolution. Wheel substrate 10A rotates at a predetermined rotational rate and control unit 20 stores information on the rotational rate of wheel substrate 10A beforehand.

In the output of color sensor 24, waveform D1 representing a first defective site appears for time t11 after a lapse of time t10 from the rising timing of the output signal from photosensor 26a.
This means that the first defective site passes through the detecting point of photosensor 26a later after the reference position of reflective mark 26c passed through the detecting point of photosensor 26a. Accordingly, control unit 20 can identify the position of the first defective site on wheel substrate 10A (the relative position of the first defective site to the reference position of reflective mark 26c), based on the rotational rate of wheel substrate 10A and times t10, t11. Here, waveform D1 may be one that represents the first degenerated site.

In the output of color sensor 24, waveform D2 representing a second defective site appears for time t21 after a lapse of time t20 from the rising timing of the output signal from photosensor 26a. This means that the second defective site passes through the detecting point of photosensor 26a time t20 later after the reference position of reflective mark 26c passed through the detecting point of photosensor 26a. Accordingly, control unit 20 can identify the position of the second defective site on wheel substrate 10A (the relative position of the second defective site to the reference position of reflective mark 26c), based on the rotational rate of wheel substrate 10A and times t20, t21. Here, waveform D2 may be one that represents a second degenerated site.

When identifying the position of a defective site or degenerated site in yellow phosphor element 10Y and reflective element 10B on wheel substrate 10A, control unit 20 causes information output unit 25 to output deterioration information indicating the position of the defective site or degenerated site.

Also in the illuminating device of the present exemplary embodiment, the operation and effect described in the first exemplary embodiment can be obtained. In addition, since the position of a defective site or degenerated site can be identified, it is possible to provide more detailed information as deterioration information of the phosphor wheel.

Further, according to the illuminating device of the present exemplary embodiment, control unit 20 can perform various light source drive controls by identifying the position of a defective site or degenerated site.

Next, examples of light source drive control will be described.

(First Example of Light Source Drive Control)

Based on the output from color sensor 24 and the output from photosensor 26a, it is possible to detect in which part, a defective site or degenerated site has occurred, reflective element 10B or yellow phosphor element 10Y. When a defective site or degenerated site has occurred in reflective element 10B, control unit 20 may be adapted to perform drive control of light source 1a so as to lower the luminance of the excitation light radiated on yellow phosphor element 10Y or shorten the time of irradiating yellow phosphor element 10Y with excitation light. On the contrary, when a defective site or degenerated site has occurred in yellow phosphor element 10Y, control unit 20 may be adapted to perform drive control of light source 1a so as to lower the luminance of the excitation light radiated on reflective element 10B or shorten the time of irradiating reflective element 10B with excitation light. Performing this control makes it possible to keep the luminance balance between red light, green light and blue light contained in the output light (illuminating light) of the light source in a preferable condition.

In addition, according to the illuminating device of the present exemplary embodiment, control unit 20 may measure the widths of defective sites and/or degenerated sites in the circumferential direction by detecting the duty ratios of waveforms D1 and D2 output from color sensor 24. Therefore, in the drive control of light source 1a, control unit 20 may be adapted to adjust the luminance or irradiating time of excitation light in accordance with the width of the defective site or degenerated site.

(Second Example of Light Source Drive Control)

Figure 14:
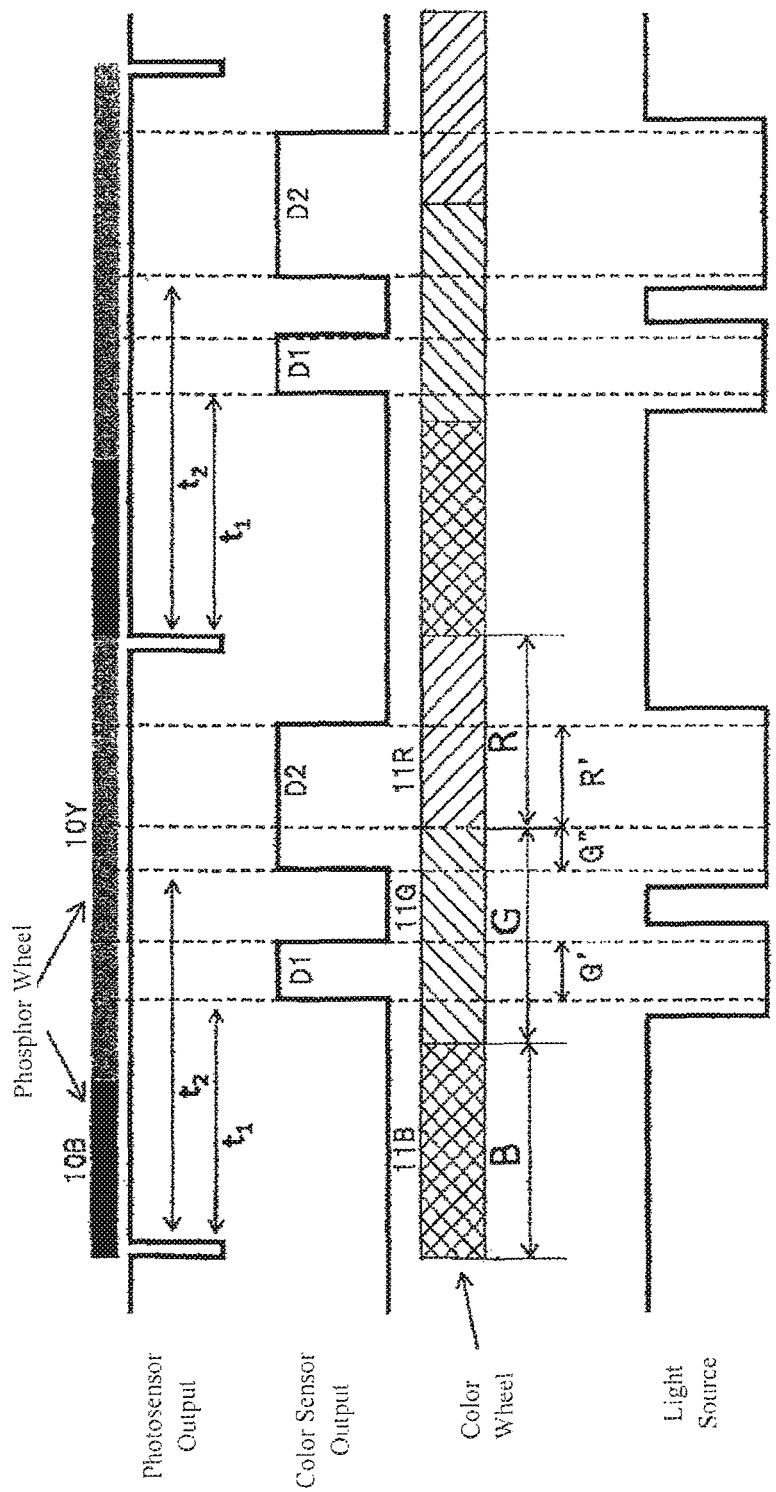
FIG. 14 A timing chart for illustrating one example of light source drive control.

FIG. 14 is a timing chart for illustrating one example of light source drive control. In FIG. 14, reflective element 10B and yellow phosphor element 10Y of the phosphor wheel, diffuser 11B, green-pass filter 11G and red-pass filter 11R of the color wheel are shown in order to illustrate the rotation timing of these wheels. The outputs from photosensor 26a and color sensor 24 are the same as those shown in FIG. 13.

In the output from sensor 24, waveform D1 and waveform D2 correspond respectively to first and second defective sites (degenerated sites) formed in yellow phosphor element 10Y. Waveform D1 and part of waveform D2 arise in duration G of green-pass filter 11G. That is, duration G of green-pass filter 11G contains duration G' corresponding to waveform D1 and duration G" corresponding to part of waveform D2. The remaining part of waveform D2 resides in duration R of red-pass filter 11R. That is, duration R of red-pass filter 11R contains duration R' corresponding to the remaining part of waveform D2.

Since the first and second defective sites (degenerated sites) of yellow phosphor element 10Y will not emit yellow fluorescence if it is irradiated with excitation light, keeping light source 1a on in duration G', duration G" and duration R' is a wasteful use of power. Further, irradiation of first and second defective sites (degenerated sites) with excitation light may produce stray light from the first and second defective sites (degenerated sites). Accordingly, it is preferable that light source 1a be turned off in durations G', G" and R'.

Control unit 20 detects durations G', G" and R' based on the outputs from photosensor 26a and color sensor 24 by rotating the phosphor wheel one revolution, and retains timing information that represents the start timing and the end timing of each of durations G', G" and R'. Herein, the start timing and the end timing are given in terms of elapsed time from the rising timing of photosensor 26a. Control unit 20, by reference to the rising timing of photosensor 26a and the retained timing information, turns off light source 1a in duration G', duration G" and duration R'.

In the example shown in FIG. 14, the start timing and the end timing of each of duration G', duration G" and duration R' contain margins. Because of inclusion of the margins, the interval specified between the start timing and the end timing becomes longer than the original duration. For example, in the case of duration G', the start timing is set at a point of time that is a predetermined time earlier than the start point of duration G' while the end timing is set at a point of time that is a predetermined time later than the end point of duration G'. In the area where a first defective site (degenerated site) in yellow phosphor element 10Y has been generated, the edge part of the yellow phosphor element (the boundary with the first defective site (degenerated site)) generates scattered light from irradiation of excitation light. This scattered light will degrade image quality in some cases. Provision of the aforementioned margins can prevent excitation light from irradiating the edge part (the boundary with the first defective site (degenerated site)) of the yellow phosphor element. Here, this margin can be set as appropriate. If scattered light is not taken into consideration, margins need not be given.

(Third Example of Light Source Drive Control)

In the example shown in FIG. 14, since no yellow fluorescence is emitted from yellow phosphor element 10Y in duration G' and duration G", the luminance of light (green light) that passed through green-pass filter 11G is lowered in duration G. Similarly, since no yellow fluorescence is emitted from yellow phosphor element 10Y in duration R', the luminance of light (red light) that passed through red-pass filter 11R is lowered in duration R. Because the luminance of green light and red light is lowered, the luminance balance between the red light, green light and blue light contained in the output light (illuminating light) of the light source is not longer in the optimal condition.

Suppose, for example, that the ratio between the luminance values (the integrated value with respect to time, which will be simply written hereinbelow as luminance) corresponding to durations of red, green and blue in one cycle of rotation of the phosphor wheel free from defect and degeneration is given as R:G:B, the ratio in the example shown in FIG. 14 is given as R2 (=R–R'):G2 (=G–G'-G"):B2 (=B). Now, it is assumed that the luminance of green light is lowered the most. In this case, R and B components become higher compared to the G component, hence the luminance balance between the red light, green light and blue light contained in the output light (illuminating light) of the light source is broken (color degradation).

In order to perform color correction to improve color gradation, control unit 20 lowers the luminance of the excitation light irradiating reflective element 10B so that the ratio R2:G2:B2 coincides with R:G:B, which is the optimal condition. Specifically, control unit 20 performs light source drive control on the basis of the transmitted light of a color whose luminance is lowered the most among the three colors of light that pass through diffuser 11B, green-pass filter 11G and red-pass filter 11R, by lowering the luminance of the transmitted light of the other colors. Since, in the example shown in FIG. 14, the luminance of the transmitted light through green-pass filter 11G is lowered the most, control unit 20 performs light source drive control so as to lower the luminance of light components through diffuser 11B and red-pass filter 11R.

Although it was assumed that yellow fluorescence is not given off in duration G', duration G" and duration R' in FIG. 14, a small amount of illuminating light may arise if excitation light is radiated. Also in this case, by determining the ratio of red, green and blue to perform color correction on the assumption that no illuminating light is generated in the deteriorated sites on the phosphor wheel, it is possible to improve color gradation of compared to when color degradation was not corrected.

Figure 15:
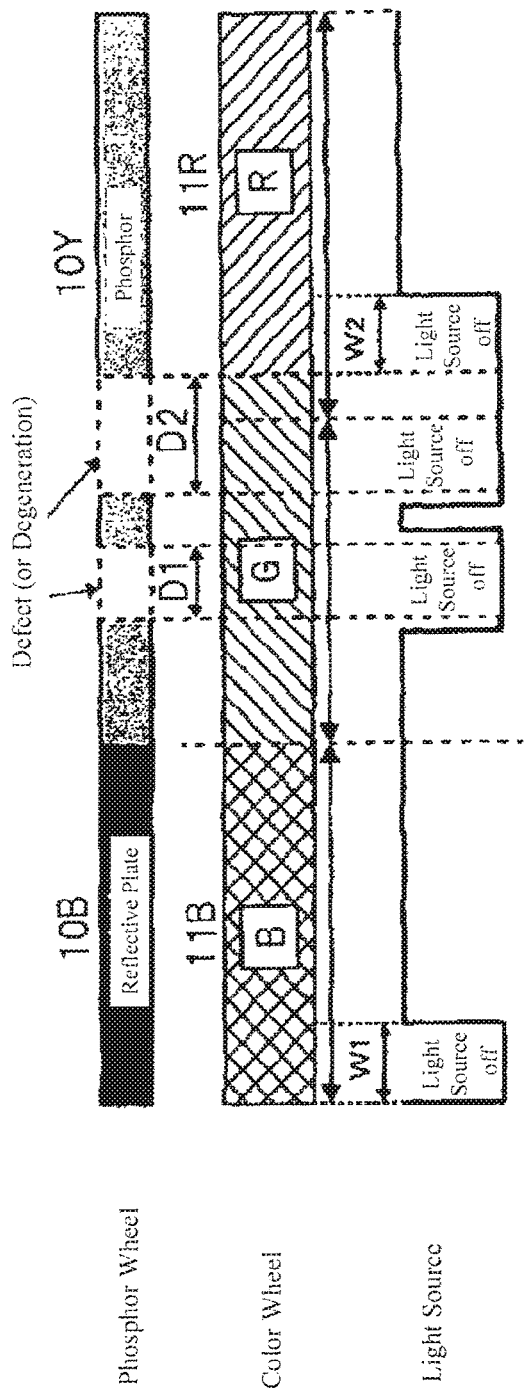
FIG. 15 A timing chart for illustrating another example of light source drive control.

FIG. 15 shows one example of light source drive control when the luminance of the transmitted light through green-pass filter 11G is lowered the most. In FIG. 15, yellow phosphor element 10Y includes first and second defective sites (degenerated sites) as shown in FIG. 14. The outputs from photosensor 26a and color sensor 24 are the same as those shown in FIG. 14, not shown in FIG. 15. Waveforms D1 and D2 correspond to the first and second defective sites (degenerated sites), respectively. Here, in this example it is assumed that R:G:B being equal to 1:1:1 is the optimal state. In the following description, the first defective site (degenerated site) is represented as deteriorated site D1 and the second defective site (degenerated site) is represented as deteriorated site D2.

Control unit 20 acquires the positions and widths of deteriorated sites D1 and D2 in yellow phosphor element 10Y, based on the outputs from photosensor 26a and color sensor 24. Control unit 20, based on the positions of deteriorated sites D1 and D2, determines that the luminance of the light transmitted through green-pass filter 11G is lowered the most.

Control unit 20 turns off light source 1a in the first duration including deteriorated site D1 and in the second duration including deteriorated site D2. Further, in duration B corresponding to diffuser 11B, control unit 20 turns off light source 1a in a predetermined time W1 from the start point and turns on light source 1a in the remaining time. Further, in duration R corresponding to red-pass filter 11R, control unit 20 turns off light source 1a in a predetermined time W2 from the end point of the second duration including deteriorated site D2 and turns on light source 1a in the remaining time. The predetermined times W1 and W2 are determined based on the optimal R:G:B ratio and the dimensions (lengths of time) of deteriorated sites D1 and D2.

Here, when R:G:B is set at another ratio than the 1:1:1, control unit 20 determines the predetermined times W1 and W2, in accordance with the ratio and the dimensions (lengths of time) of deteriorated sites D1 and D2.

Figure 16:
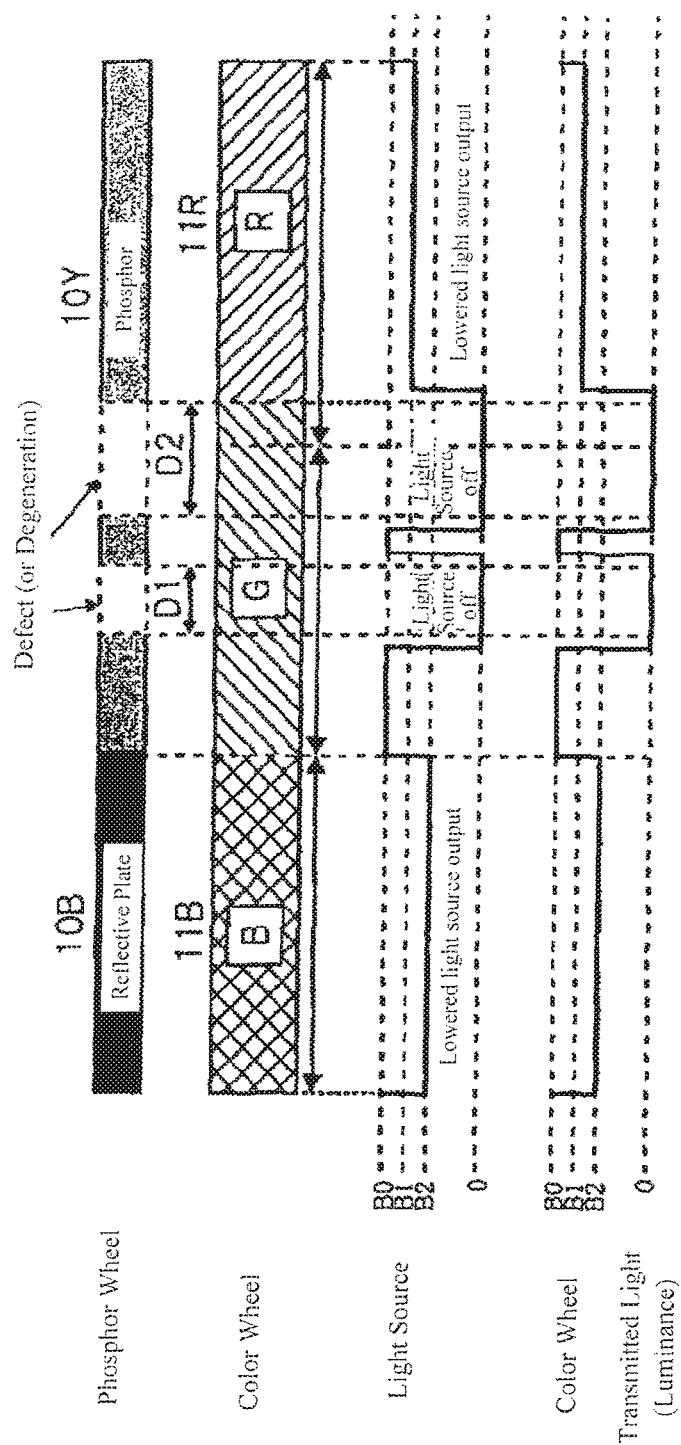
FIG. 16 A timing chart for illustrating still another example of light source drive control.

FIG. 16 shows another example of light source drive control when the luminance of the transmitted light through green-pass filter 11G is lowered the most. In FIG. 16, yellow phosphor element 10Y includes first and second defective sites (degenerated sites) as shown in FIG. 14. The outputs from photosensor 26a and color sensor 24 are the same as those shown in FIG. 14, not shown in FIG. 16. Waveforms D1 and D2 correspond to the first and second defective sites (degenerated sites), respectively. Here, also in this example it is assumed that R:G:B being equal to 1:1:1 is the optimal state. In the following description, the first defective site (degenerated site) is represented as deteriorated site D1 and the second defective site (degenerated site) is represented as deteriorated site D2.

Control unit 20 acquires the positions and widths of deteriorated sites D1 and D2 in yellow phosphor element 10Y, based on the outputs from photosensor 26a and color sensor 24. Control unit 20, based on the positions of deteriorated sites D1 and D2, determines that the luminance of the light transmitted through green-pass filter 11G is lowered the most.

Control unit 20 turns off light source 1a in the first duration including deteriorated site D1 and in the second duration including deteriorated site D2. In duration G corresponding to green-pass filter 11G, control unit 20 turns on light source 1a at luminance B2 (B0>B1>B2). In the time other than the first and second durations in duration B corresponding to diffuser 11B, control unit 20 turns on light source 1a at luminance B0. In the time other than the second duration in duration R corresponding to red-pass filter 11R, control unit 20 turns on light source 1a at luminance B1. Herein, luminance levels B0 to B2 are determined in accordance with the optimal R:G:B ratio and the dimensions (time lengths) of deteriorated sites D1 and D2.

Also in the illuminating device of the present exemplary embodiment, the variational examples illustrated in the first exemplary embodiment can be applied.

In the illuminating device of the present exemplary embodiment, control unit 20 may store deterioration information in an unillustrated storage. In this case, it is possible for a person in charge of repair to confirm the state of deterioration of the phosphor wheel by reference to the storage.

The deterioration information may not only include information on the occurrence of deterioration of the phosphor wheel and information on deteriorated positions but also include information on the maximum luminance after color correction and information on whether or not color correction can be performed. Here, it is possible to determine that color correction is unfeasible if the maximum luminance after color correction is smaller than a predetermined value.

(Third Exemplary Embodiment)

An illuminating device of the third exemplary embodiment of the present invention is the same as that explained in the first or second exemplary embodiment except in that wheel substrate 10A of the phosphor wheel shown in FIG. 7 is replaced by a phosphor wheel formed of a dichroic mirror.

Figure 17A:
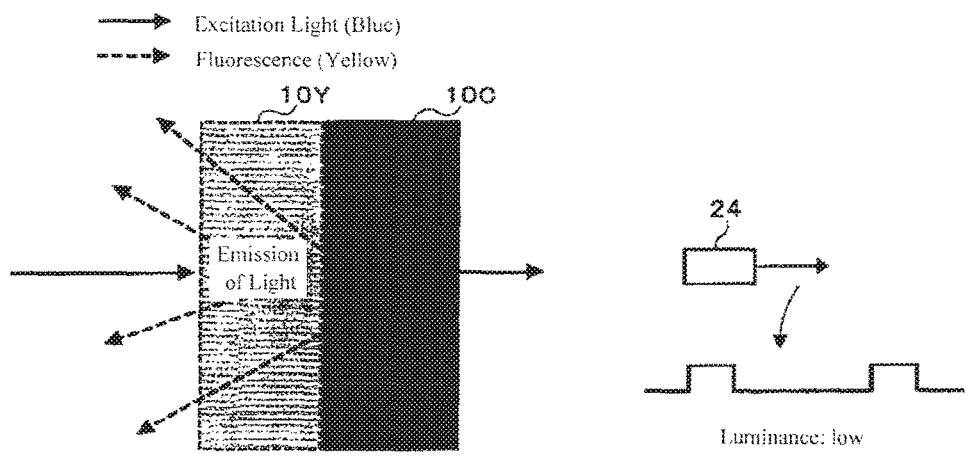
FIG. 17A A schematic diagram for illustrating an illuminating device as the third exemplary embodiment of the present invention.

FIG. 17A shows a state where excitation light from light source 1a is radiated on yellow phosphor element 10Y. In FIG. 17, the arrows shown by the solid line indicate excitation light, whereas the arrows shown by the dashed line indicate yellow fluorescence.

As shown in FIG. 17A, in yellow phosphor element 10Y, the phosphor is excited by the incident excitation light to emit yellow fluorescence. Dichroic mirror 10 has such characteristics as to transmit light in a blue wavelength range and reflect light in the other wavelength ranges. Accordingly, of yellow fluorescence, the yellow fluorescence propagating toward the dichroic mirror 10C side reflects off dichroic mirror 10C toward lens 1c. Of the excitation light incident on yellow phosphor element 10Y, the excitation light that has not been used for excitation of the phosphor, directly passes through dichroic mirror 10C and enters color sensor 24.

Figure 17B:
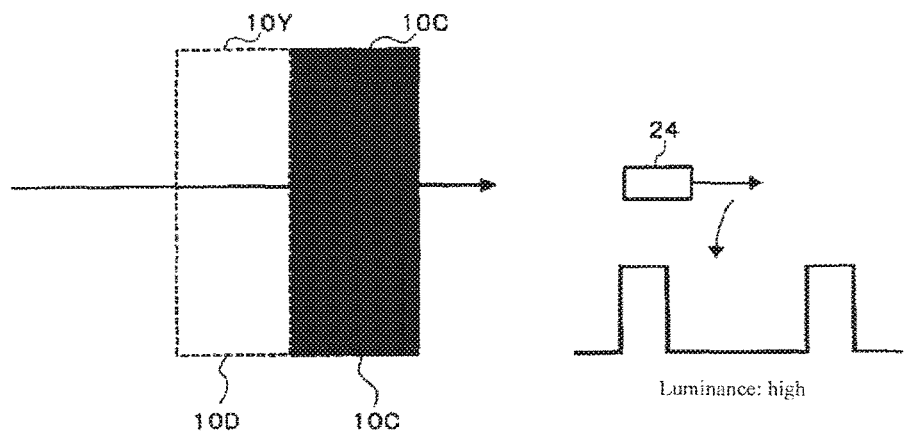
FIG. 17B A schematic diagram for illustrating an illuminating device as the third exemplary embodiment of the present invention.

FIG. 17B shows a state where excitation light from light source 1c is radiated on defective site 10D. In this case, excitation light passes through defective site 10D and dichroic mirror 10C to enter color sensor 24. The luminance of the excitation light entering color sensor 24 is sufficiently high compared to the luminance of the excitation light entering on color sensor 24 in the state shown in FIG. 17A. Accordingly, control unit 20 can accurately detect defective site 10D based on the output signal from color sensor 24.

(Projector)

Next, a projector that includes an illuminating device of the present invention will be described.

Figure 18:
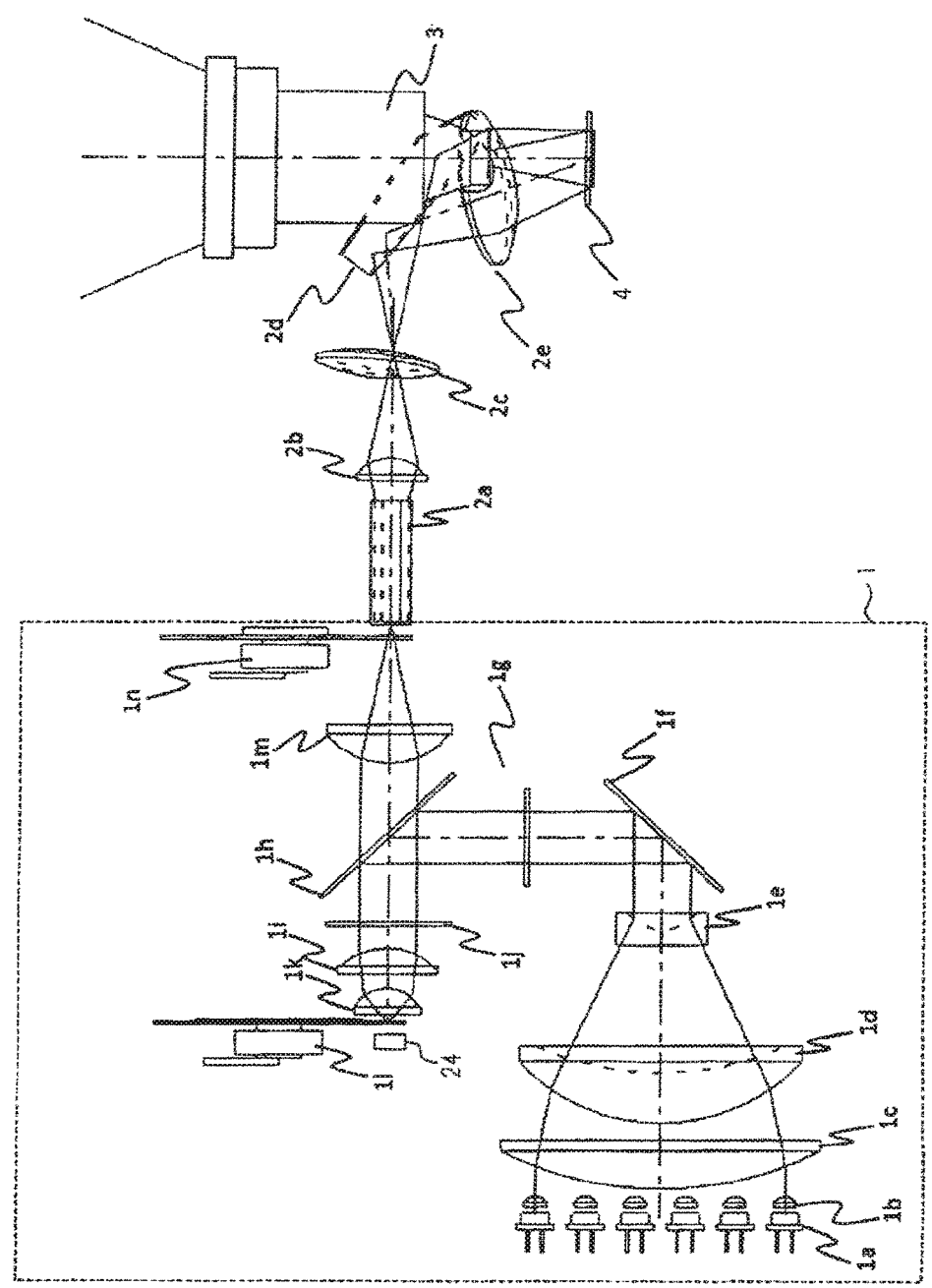
FIG. 18 A schematic diagram showing a projector equipped with an illuminating device of the present invention.

FIG. 18 is a schematic diagram showing a configuration of a projector equipped with an illuminating device of the present invention.

Referring to FIG. 18, the projector includes light source unit 1, illumination optics 2, projection optics 3 and image forming unit 4. Light source unit 1 uses any one of the light source units of the illuminating devices of the first to third exemplary embodiments. Herein, light source unit 1 and illumination optics 2 constitute the illuminating device.

Illumination optics 2 conducts output light from light source unit 1 to a display device of image forming unit 4 and supplies rectangular uniform illumination to the display device. Illumination optics 2 includes light tunnel 2a, lenses 2b, 2c, 2e and mirror 2d.

Light tunnel 2a has a cuboid configuration. The output light from light source unit 1 enters one end of light tunnel 2a and light that has propagated through light tunnel 2a exits from the other end of light tunnel 2a. The face (the incident surface) of the one end of light tunnel 2a is arranged at the focal position of lens 1m of light source unit 1. The irradiated surface of the phosphor wheel of phosphor unit 1l and the incident surface of light tunnel 2a have an imaging relationship therebetween.

Light that exited from the other end of light tunnel 2a passes through lenses 2b, 2c, mirror 2d and lens 2e to irradiate display device 4. Lenses 2b, 2c and 2e are condenser lenses.

Image forming unit 4 spatially modulates the flux of light from illumination optics 2 in accordance with a video signal to form an image. The display device provided in image forming unit 4 may be a digital micromirror device (DMD), for instance. A DMD includes a plurality of micromirrors, each being formed to change its angle in accordance with the drive voltage. The angle of reflection of light from the micromirror when an ON state drive voltage is supplied is different from that of the micromirror when an OFF state drive voltage is supplied. The flux of incident light is spatially modulated by performing On-and-Off control of each micromirror in accordance with a video signal to form an image. The control unit provided for the illuminating device controls the display device by way of image forming unit 4 based on the drive time, timing and output luminance of the light source shown in FIG. 15 or FIG. 16. Here, display device 4 may use liquid crystal panels and the like other than DMDs.

Projection optics 3 enlarges and projects the image formed on image forming unit 4 onto the projected surface. The projected surface may be any form such as a screen, wall or the like as long as the image can be projected thereon.

The thus described illuminating devices and projector according to the first to third exemplary embodiments are mere examples of the present invention, and the configuration and operation can be changed as appropriate.

The present invention can take the configurations described in the following Supplementary Notes 1 to 17, but should not be limited to these configurations.

[Supplementary Note 1] An illuminating device comprising:

a light source that emits excitation light;

a wheel that includes a wheel substrate through which the excitation light is transmitted and an illuminating light generating member that is provided on a first surface of the wheel substrate to generate illuminating light by the excitation light;

a photo detector that is arranged on a second surface side that is opposite to the first surface of the wheel substrate to detect light that passed through the wheel; and, a control unit that determines whether a defect or degeneration has occurred in the illuminating light generating member, based on the light detected by the photo detector.

[Supplementary Note 2] The illuminating device according to Supplementary Note 1, further comprising a rotating mechanism that rotates the wheel, wherein the control unit detects a size of a deteriorated site where the defect or degeneration has occurred, based on a signal that represents a light intensity from the photo detector.

[Supplementary Note 3] The illuminating device according to Supplementary Note 2, further comprising a timing detector that detects rotation timing of the wheel, wherein the control unit identifies a position of the deteriorated site on the wheel substrate, based on a signal output that indicates rotation timing of the wheel substrate from the timing detector and the signal that indicates a change in the light intensity from the photo detector.

[Supplementary Note 4] The illuminating device according to Supplementary Note 3, wherein the timing detector includes:

a detection mark that is provided in the wheel;

a light emitting element that radiates light toward the wheel; and, a photosensor that detects reflected light from the detection mark, wherein the control unit identifies the position of the deteriorated site on the wheel substrate, based on a signal that indicates detection timing of the detection mark and that is output from the photosensor and the signal that indicates the change in the light intensity from the photo detector.

[Supplementary Note 5] The illuminating device according to Supplementary Note 3 or 4, wherein the control unit controls the light output from the light source so that at least the deteriorated site is not irradiated with the excitation light.

[Supplementary Note 6] The illuminating device according to Supplementary Note 3 or 4, wherein the illuminating light generating member includes:

a phosphor generating element that includes a phosphor that is excited by the excitation light; and a reflective element that reflects the excitation light, wherein the control unit determines in which of the phosphor generating element and reflective element the deteriorated site has occurred.

[Supplementary Note 7] The illuminating device according to Supplementary Note 6, wherein when determining that the deteriorated site has occurred in the phosphor generating element, the control unit controls the light output from the light source so as to lower the luminance of the excitation light radiated on the reflective element.

[Supplementary Note 8] The illuminating device according to Supplementary Note 6, wherein when determining that the deteriorated site has occurred in the reflective element, the control unit controls the light output from the light source so as to lower the luminance of the excitation light radiated on the phosphor generating element.

[Supplementary Note 9] The illuminating device according to Supplementary Note 3 or 4, wherein the illuminating light generating member includes:

a phosphor generating element that includes a yellow phosphor that is excited by the excitation light; and a reflective element that reflects the excitation light, wherein the illuminating device further comprises:

an optics that conducts yellow fluorescence emitted from the phosphor generating element and blue light as reflected light from the reflective element into a same light path; and a color wheel that is irradiated with the yellow fluorescence and blue light via the optics, wherein the color wheel includes a green-pass filter, red-pass filter and blue-pass filter and is constructed such that the yellow fluorescence is successively radiated on the green-pass filter and red-pass filter and the blue light is radiated on the blue-pass filter, and, the control unit controls the light output from the light source based on the position of the deteriorated site so that the ratio between the green light as the light transmitted through the green-pass filter, the red light as the light transmitted through the red-pass filter, the blue light as the light transmitted through the blue-pass filter in a predetermined period of time, will have a predetermined ratio.

[Supplementary Note 10] The illuminating device according to Supplementary Note 3 or 4, wherein the illuminating light generating member includes:

a red phosphor element that includes a red phosphor that is excited by the excitation light to emit red fluorescence;

a green phosphor element that includes a green phosphor that is excited by the excitation light to emit green fluorescence; and a blue phosphor element that includes a blue phosphor that is excited by the excitation light to emit blue fluorescence, wherein the control unit determines in which, of the red phosphor element, green phosphor element, green phosphor element and blue phosphor element, the deteriorated sit has occurred, and controls the light output from the light source so as to lower the luminance of the excitation light radiated on the phosphor generating elements expect on the phosphor generating element where the deteriorated site occurs.

[Supplementary Note 11] The illuminating device according to Supplementary Note 2, wherein the control unit controls the output light from the light source, based on the signal that indicates the light intensity from the photo detector, so that the excitation light is not radiated on the deteriorated site.

[Supplementary Note 12] The illuminating device according to any one of Supplementary Notes 1 to 11, wherein the excitation light is blue light, and the wheel substrate is a transparent substrate that transmits visible light.

[Supplementary Note 13] The illuminating device according to any one of Supplementary Notes 1 to 11, wherein the excitation light is blue light, and the wheel substrate is a dichroic mirror that transmits light in a blue wavelength range and reflects light in wavelength ranges other than the blue wavelength range.

[Supplementary Note 14] The illuminating device according to any one of Supplementary Notes 1 to 13, further comprising an information output unit that outputs information, wherein when a defect or degeneration has occurred in the illuminating light generating member, the control unit makes the information output unit issue deterioration information that indicates the defect or degeneration.

[Supplementary Note 15] The illuminating device according to any one of Supplementary Notes 1 to 13, further comprising a storage that stores information, wherein when a defect or degeneration has occurred in the illuminating light generating member, the control unit stores deterioration information that indicates the defect or degeneration in the storage.

[Supplementary Note 16] A wheel deterioration detecting method of detecting deterioration of a wheel that includes: a wheel substrate that transmits excitation light; and an illuminating light generating member which is provided on a first surface of the wheel substrate to generate illuminating light by the excitation light, the method comprising:

using a photo detector which is arranged on a second surface side that is opposite to the first surface of the wheel substrate to detect light that passed through the wheel; and, determining whether a defect or degeneration has occurred in the illuminating light generating member, based on the light that is detected by the photo detector.

[Supplementary Note 17] A projector comprising:

an illuminating device according to any one of Supplementary Notes 1 to 15;

an image forming unit that modulates illuminating light from the illuminating device based on an input video signal to form an image; and a projection optics that projects the image that is formed by the image forming unit.

DESCRIPTION OF REFERENCE NUMERALS 1a light source
1b collimator lens
1f polarizing beam splitter
1g diffuser
1h dichroic mirror
1j quarter-wave plate
1l phosphor unit
1n color filter unit
20 control unit
21 phosphor wheel driver
22 color wheel driver
23 light source driver
24 color sensor
25 information output unit

The invention claimed is:

1. An illuminating device, comprising;
a light source that emits excitation light;
a wheel that includes a wheel substrate through which the excitation light is transmitted and an illuminating light generating member that is provided on a first surface of the wheel substrate to generate, at a side of the first surface, effective light as illuminating light by the excitation light;
a photo detector that is arranged on a side of a second surface that is opposite to the first surface of the wheel substrate to detect light that passed through the wheel; and
a control unit that determines whether a defect or a degeneration has occurred in the illuminating light generating member, based on the light detected by the photo detector.

2. The illuminating device according to claim 1, wherein the control unit detects a deteriorated site where the defect or the degeneration has occurred, based on the light detected by the photo detector.

3. The illuminating device according to claim 2, further comprising a rotating mechanism that rotates the wheel and a timing detector that detects a rotation timing of the wheel,
wherein the control unit identifies a position of the deteriorated site on the wheel substrate based on a signal output that indicates a rotation timing of the wheel substrate from the timing detector and a signal that indicates a change in a light intensity from the photo detector.

4. The illuminating device according to claim 3, wherein the timing detector includes:
a detection mark that is provided in the wheel;
a light emitting element that radiates light toward the wheel; and a photosensor that detects reflected light from the detection mark,
wherein the control unit identifies the position of the deteriorated site on the wheel substrate, based on a signal that indicates a detection timing of the detection mark and that is output from the photosensor and the signal that indicates the change in the light intensity from the photo detector.

5. The illuminating device according to claim 2, wherein the control unit controls a light output from the light source so that at least the deteriorated site is not irradiated with the excitation light.

6. The illuminating device according to claim 2, wherein the illuminating light generating member includes:
a phosphor generating element that includes a phosphor that is excited by the excitation light; and
a reflective element that reflects the excitation light,
wherein the control unit further determines in which of the phosphor generating element and reflective element the deteriorated site has occurred.

7. The illuminating device according to claim 6, wherein, when determining that the deteriorated site has occurred in the phosphor generating element, the control unit controls the light output from the light source so as to lower a luminance of the excitation light radiated on the reflective element.

8. The illuminating device according to claim 6, wherein, when determining that the deteriorated site has occurred in the reflective element, the control unit controls the light output from the light source so as to lower a luminance of the excitation light radiated on the phosphor generating element.

9. The illuminating device according to claim 3, wherein the illuminating light generating member includes:
a phosphor generating element that includes a phosphor that is excited by the excitation light to emit yellow fluorescence; and
a reflective element that reflects the excitation light,
wherein the illuminating device further comprises:
an optics that conducts the yellow fluorescence emitted from the phosphor generating element and blue light as reflected light from the reflective element into a same light path; and
a color wheel that is irradiated with the yellow fluorescence and blue light via the optics,
wherein the color wheel includes a green-pass filter, a red-pass filter, and a blue-pass filter, and is constructed such that the yellow fluorescence is successively radiated on the green-pass filter and the red-pass filter, and the blue light is radiated on the blue-pass filter, and
wherein the control unit controls a light output from the light source based on the position of the deteriorated site so that a ratio between the green light as the light transmitted through the green-pass filter, the red light as the light transmitted through the red-pass filter, the blue light as the light transmitted through the blue-pass filter in a predetermined period of time, will have a predetermined ratio.

10. The illuminating device according to claim 3, wherein the illuminating light generating member includes:
a red phosphor element that includes a red phosphor that is excited by the excitation light to emit red fluorescence;
a green phosphor element that includes a green phosphor that is excited by the excitation light to emit green fluorescence; and a blue phosphor element that includes a blue phosphor that is excited by the excitation light to emit blue fluorescence, and wherein the control unit determines in which of the red phosphor element, the green phosphor element, the green phosphor element, and the blue phosphor element, the deteriorated site has occurred, and controls a light output from the light source so as to lower a luminance of the excitation light radiated on the phosphor generating elements expect on the phosphor generating element where the deteriorated site occurs.

11. The illuminating device according to claim 2, wherein the control unit controls an output light from the light source, based on the light detected by the photo detector, so that the excitation light is not radiated on the deteriorated site.

12. The illuminating device according to claim 1, wherein the excitation light comprises blue light, and the wheel substrate comprises a transparent substrate that transmits visible light.

13. The illuminating device according to claim 1, wherein the excitation light comprises blue light, and the wheel substrate comprises a dichroic mirror that transmits light in a blue wavelength range and reflects light in wavelength ranges other than the blue wavelength range.

14. The illuminating device according to claim 1, further comprising an information output unit that outputs information, wherein, when the defect or the degeneration has occurred in the illuminating light generating member, the control unit makes the information output unit issue deterioration information that indicates the defect or the degeneration.

15. The illuminating device according to claim 1, further comprising a storage that stores information, wherein, when the defect or the degeneration has occurred in the illuminating light generating member, the control unit stores deterioration information that indicates the defect or the degeneration in the storage.

16. A wheel deterioration detecting method of detecting deterioration of a wheel that includes a wheel substrate that transmits excitation light, and an illuminating light generating member which is provided on a first surface of the wheel substrate to generate, at a side of the first surface, effective light as illuminating light by the excitation light, the method comprising:

detecting light that passed through the wheel at a side of a second surface that is opposite to the first surface of the wheel substrate; and determining whether a defect or a degeneration has occurred in the illuminating light generating member, based on the light that is detected.

17. A projector, comprising:

the illuminating device according to claim 1;

an image forming unit that modulates illuminating light from the illuminating device based on an input video signal to form an image; and a projection optics that projects the image that is formed by the image forming unit.

18. The illuminating device according to claim 1, further comprising:

a rotating mechanism that rotates the wheel; and a timing detector that detects a rotation timing of the wheel.

19. The illuminating device according to claim 18, wherein the control unit identifies a position of a deteriorated site on the wheel substrate based on a signal output that indicates a rotation timing of the wheel substrate from the timing detector and a signal that indicates a change in a light intensity from the photo detector.

20. The illuminating device according to claim 1, wherein the control unit stores deterioration information after the defect or the degeneration is occurred.

* * * * *